United States Patent
Kaczynski et al.

(10) Patent No.: US 6,236,503 B1
(45) Date of Patent: May 22, 2001

(54) MICROSCOPE STAND FOR A WAFER INSPECTION MICROSCOPE

(75) Inventors: Ulrich Kaczynski, Bad Nauheim; Roland Hedrich, Ehringshausen, both of (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/486,704

(22) PCT Filed: Aug. 4, 1998

(86) PCT No.: PCT/DE98/02230

§ 371 Date: Mar. 6, 2000

§ 102(e) Date: Mar. 6, 2000

(87) PCT Pub. No.: WO99/17146

PCT Pub. Date: Apr. 8, 1999

(30) Foreign Application Priority Data

Sep. 27, 1997 (DE) .............................. 197 42 802

(51) Int. Cl.[7] ............................ G02B 21/26; G02B 21/00
(52) U.S. Cl. ......................... 359/391; 359/368; 359/379
(58) Field of Search ..................... 359/368–398

(56) References Cited

U.S. PATENT DOCUMENTS

| | | | |
|---|---|---|---|
| 2,214,367 | * | 9/1940 | Gallasch ............... 359/382 |
| 2,360,268 | * | 10/1944 | Ott .................... 359/382 |
| 3,103,844 | * | 9/1963 | Persson ................ 359/384 |
| 3,834,966 | * | 9/1974 | Kelly .................. 359/393 |
| 4,106,851 | * | 8/1978 | Considine et al. ...... 359/390 |
| 4,328,713 | | 5/1982 | Lund ................... 74/479 |
| 4,582,191 | | 4/1986 | Weigand ............... 198/339.1 |
| 5,450,233 | | 9/1995 | Yamamoto et al. ....... 359/368 |
| 5,552,928 | | 9/1996 | Furuhashi et al. ...... 359/379 |
| 5,812,311 | | 9/1998 | Kragolnik ............. 359/393 |

FOREIGN PATENT DOCUMENTS

| | | |
|---|---|---|
| 196 01 731 | 7/1997 | (DE) . |
| 2 235 062 | 2/1991 | (GB) . |
| 5-127092 | * 5/1993 | (JP) ............... 359/374 |

OTHER PUBLICATIONS

"MX50 Semiconductor Inspection Microscope", Olympus the Invisible Difference, Art. No. 30798, pp. 2–19, May 1997.

* cited by examiner

Primary Examiner—Thong Nguyen
(74) Attorney, Agent, or Firm—Foley & Lardner

(57) ABSTRACT

The invention relates to an inspection microscope for the semiconductor industry. The microscope stand consists of a foot (1), a pillar (4) and a crosshead (5). In order to facilitate unobstructed feeding of samples from the back part of the microscope stand, the pillar (4) is mounted laterally next to the back end of the foot (1) and the crosshead (5) arranged thereon when seen from the front. This makes it possible to save space and avoid adaptations when integrating the microscope stand into the clusters in the test area of the semiconductor industry and to feed test objects directly from the back of the microscope stage (3). In an especially advantageous construction of the stand, the inspection microscope is particularly suitable for examining large-surface objects (e.g. flat screens or 400 nm wafers).

20 Claims, 4 Drawing Sheets

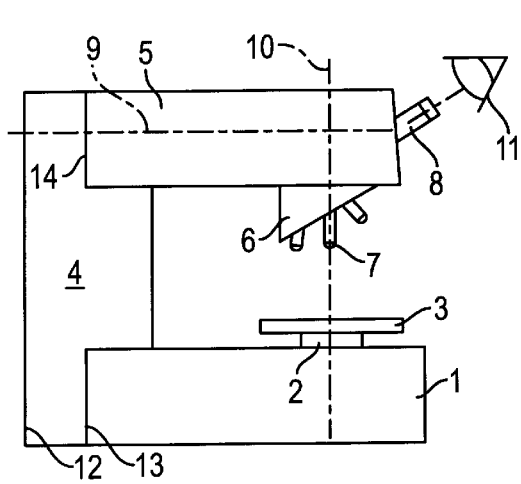
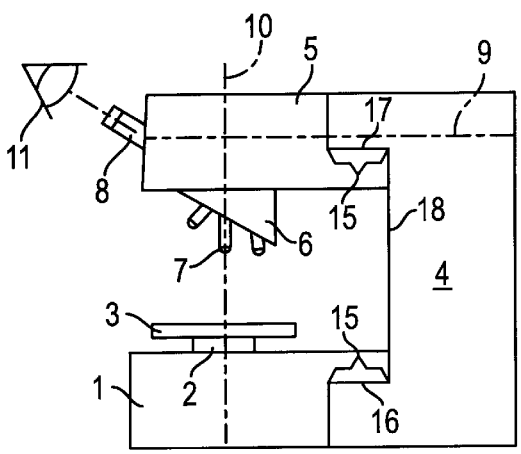
FIG. 2A
FIG. 2B
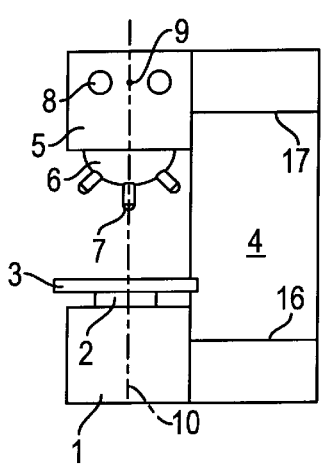
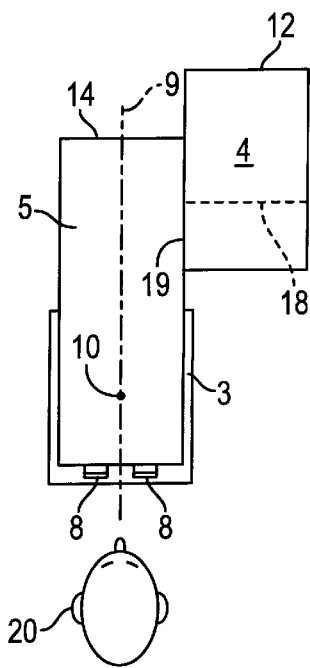
FIG. 2C
FIG. 2D

MICROSCOPE STAND FOR A WAFER INSPECTION MICROSCOPE

BACKGROUND OF THE INVENTION

The invention relates to a microscope stand for a wafer inspection microscope.

Inspection microscopes are used in the semiconductor industry to check the fabrication stages of wafers and/or semiconductor modules. They mostly have the capacity to feed the wafer automatically from wafer storage cassettes. In this case, for the purpose of each microscopic investigation an individual wafer is automatically respectively extracted from a cassette and, after investigation, redeposited therein or in another cassette.

In wafer production, a plurality of fabrication and test steps are arranged in close proximity to one another spatially in so-called clusters in the production area, in order to utilize the cost intensive clean room area optimally. The wafers investigated and processed are passed on from one processing step to the next, without being redeposited in the storage cassettes provided for them. The arrangement of the individual operations in a cluster is classically next to one another downstream of a wall. Provided directly downstream of the wall is a type of conveying belt for the wafers, from which the wafers can be removed for the individual operations and redeposited there. The individual fabrication and test units are arranged downstream of the transportation system and arranged downstream of this, in turn, the work stations for the operating staff. This requires it to be possible for each processing unit, or else test unit to be arranged in a row and be loaded from behind.

In the previously known classic microscopes of so-called "C" design, the stand base, the pillar and the crosshead form a "C" open toward the user in side view. The generically determinative DE 196 01 731 A1 describes such a microscope. In front view, the crosshead is arranged, with assigned objective, at a distance above the stand base with assigned condenser, and the pillar is arranged behind these two. The stand base bears the object stage which, as seen by the observer, is accessible from the left, right and front for the user. However, it is not possible to load the object stage with samples from behind.

The MX50 microscope from Olympus also has a "C stand". Details on this microscope are to be found in the company brochure "Halbleiter-InspektionsMikroskop MX50", ["MX50 semiconductor inspection Microscope"] Art. No. 30798. A feeder station is connected on the left next to the microscope. As a rule, such a feeder station comprises a wafer storage cassette for the wafers to be investigated, and at least one further one for the investigated wafer, as well as a handling system for transporting the wafers between the storage cassettes and the object stage. The wafer feed to the object stage of the microscope is performed in this case from the left. The storage cassettes with the wafers need to be inserted manually into the feeder and also re-extracted manually.

This contradicts the customary processing procedure in a cluster, in which the individual wafers are automatically fed from the rear side to the test stations from a conveying belt and, after testing, are also redelivered to the conveying belt after there [sic]. However, the wafer conveying belt and the feeder station must be adapted to one another as far as possible with connecting elements in order to incorporate the previously known inspection microscope with feeder station in the cluster operation. In this case, it is not always possible to arrange the inspection microscope with the feeder in the row next to the other investigating units in the cluster. In order to incorporate it in the other process steps, it is frequently necessary to place it obliquely into the room, with the result that it projects into the narrow passage for the work stations of the operating staff. This additionally requires cost-intensive clean room area.

Such an adaptation is frequently not even possible. The point is that the manual wafer supply of the feeder with wafer cassettes remains as before, and therefore necessitates regular staff intervention, which constitutes an even greater disadvantage for operation.

Thus, the disadvantage of the previously known classic microscope stand of "C" design consists in that it is not possible for the microscope object stage to be loaded from behind, as is required in the semiconductor industry.

U.S. Pat. No. 4,582,191 therefore describes as a supplement to these classic microscopes a special annular transportation and handling system which is arranged at a spacing around the pillar. A stationary standing ring provided with slide rails is borne by an angle piece which is screwed to the pillar. Movably arranged on the slide rails is a second, concentric transportation ring which is fitted with wafer holding devices. The wafers are fed to this annular transportation system from a storage cassette via a lateral assembly line device, and moved around the pillar by motor. It follows that the described transportation system can also be used to guide wafers from the rear side of the column around the latter to the front side. There, the wafer is handed over to the object stage, on which there is mounted in addition a special height adapter with a wafer vacuum holder.

A disadvantage of the system described consists in that the annular transportation system is fastened on the pillar. A microscope of the performance class required for the investigations mentioned is a very sensitive unit which is extremely accurately tuned in design with reference to a low vibration response and high quality statics. Thus, any mass not provided by the manufacturer and additionally attached such as, for example, the annular transportation system, influences the balanced statics and thereby impairs the imaging behavior of the microscope. Furthermore, the vibrations of the drive motor of the annular transportation system can be transmitted disturbingly to the stand.

Moreover, with its motor and its guide elements sliding on one another, the annular transportation system additionally produces undesired contaminations in the clean rooms. Owing to its dimensions, the annular transportation system also additionally enlarges the floor space of the microscope, and thereby lays claim to expensive floor area of the clean room.

The problem of incorporating inspection microscopes in the fabrication lines of the semiconductor industry is therefore an urgent one, even in the case of a modern inspection microscope—such as that named by way of example—and for the use of auxiliary transportation systems, since the outlay on conversion and adaptation measures, a high usage of space on the clean room floor area, contaminations of the clean room, uneconomic work cycles and a high level of staff use impinge directly on the production costs.

It is therefore the object of this invention to specify a microscope stand with a small footprint for a wafer inspection microscope which ensures increased freedom in the loading of the object stage with large-area wafers. It is intended not to introduce any additional contaminations into the clean room. Moreover, the novel stand is also to permit investigations on large-area objects, in order to satisfy future demands from the semiconductor industry with reference to investigation on large-area wafers.

SUMMARY OF THE INVENTION

In the known classic forms of microscope stand, a "structural equipment symmetry plane" is defined by the vertical optical axis, which runs through the objective and the condenser, and the horizontal axis of the crosshead beam path. In this case the invention is based on the idea of arranging the pillar no longer as a directly connecting element between stand base and crosshead, but adjacent thereto, in order thereby also to permit samples to be loaded from behind—that is to say from the side averted from the operator. For this purpose, the column is positioned outside the earlier "equipment symmetry plane", specifically on the right or the left in the rear stand area averted from the microscope viewer. This is achieved by a single pillar attached laterally next to the stand base and the crosshead located at a spacing thereabove.

This provides the stand with the capability, as an outstanding novel property, of being freely loaded from behind, that is to say from the direction of the pillar, in addition to the usual loading directions from the sides and also from the front. By suitably arranging and constructing the pillar, it is even possible to investigate very-large-area objects, because an extended traversing area is produced for the object stage.

The invention is described in more detail below with the aid of the diagrammatic drawings, in which:

BRIEF DESCRIPTION OF THE DRAWINGS

FIG. 1a: shows the left-hand side view, FIG. 1b: shows the right-hand side view, FIG, 1c: shows the front view, FIG. 1d: shows the plan view, FIGS. 2a–2d show a second exemplary embodiment according to the invention with an extremely large traversing area of the object stage, specifically FIG. 2a: shows the left-hand side view, FIG. 2b: shows the right-hand side view, FIG. 2c: shows the front view, FIG. 2d: shows the plan view, FIG. 4b: shows a third exemplary embodiment with pillar lengthening with respect to FIG. 4a.

The classic form of stand with a stand base, pillar and crosshead in the form of a large annular "C" is to be seen in the microscope according to the invention both in side view and, additionally, in front view. For this purpose, the novel microscope stand is represented both in the two side views as well as in the front view and in the plan view.

Figure 1A:
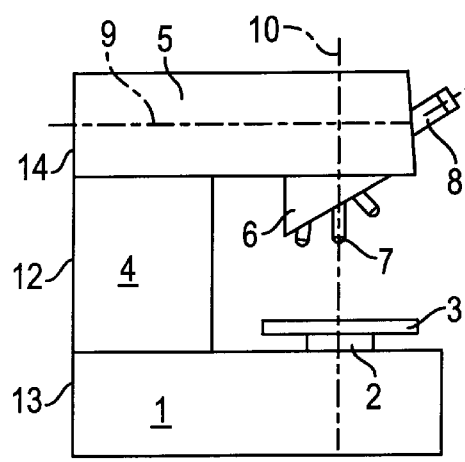
FIGS. 1a–1d: show a first exemplary embodiment according to the invention, specifically
Figure 1B:
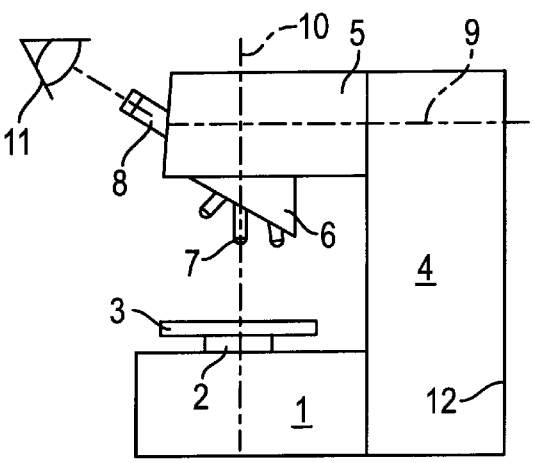

FIG. 1a shows the side view of a first exemplary embodiment from the left, and FIG. 1b shows the side view from the right. In both figures, the classic stand design in the form of a large "C" is to be seen. The essential parts of the microscope stand are represented, that is to say a stand base 1 with an integrated condenser 2 and an object stage 3 arranged thereabove, and also a pillar 4, a crosshead 5 with an objective device 6 and micro-objectives 7 located thereon. Integrated in the crosshead 5 is a tube, not represented in more detail here, with an ocular device 8. A horizontal optical axis 9 of the crosshead 5 is fixed by the horizontal beam path in the crosshead 5. The beam path running vertically through the micro-objective 7, located in the operating position, and the condenser 6 fixes a vertical optical axis 10 of the microscope. Likewise represented is a viewer 11. In the embodiment represented, a surface 12 of the pillar 4 which is a rear one as seen by the viewer 11 terminates in the same plane with a rear surface 13 of the stand base 1 and a rear surface 14 of the crosshead 5.

In FIG. 1a, the stand base 1 and the crosshead 5 are located in the foreground of the representation, the pillar 4 is arranged behind both of them and covered at the top by the crosshead 5 and at the bottom by the stand base 1. In FIG. 1b, the stand base 1 and the crosshead 5 are arranged in the background. The pillar 4 stands in front thereof. In this view, it covers the rear portion of the stand base 1 and crosshead 5, which are each located on the right in this representation. Consequently, only the rear surface 12 of the pillar 4 is to be seen. Thus, in both FIGS. 1a and 1b the classically known "C" form of already known microscope stands may be seen once again.

Figure 1C:
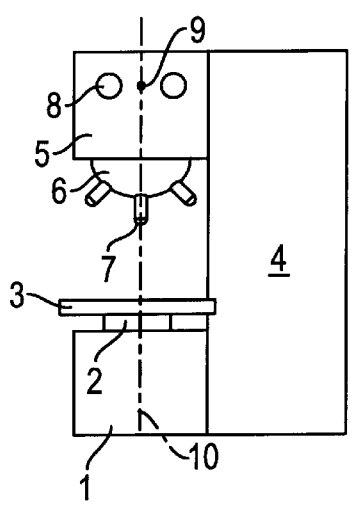

The essential novelty of the stand according to the invention is now to be seen in FIG. 1c, the front view. Represented at the bottom is the stand base 1 with the condenser 2 and the object stage 3. Located thereabove at a spacing are the crosshead 5 with the objective device 6 and the objectives 7, as well as the ocular device 8. In this view, the horizontal optical axis 9 of the crosshead 5 is likewise to be seen only in front view, and is therefore represented only as a point. The vertical optical axis 10 through the operating objective 7 and the condenser 2 appears in this view as the axis of symmetry of the stand base 1 and of the crosshead 5. Whereas in the case of previously known classic forms of stand the pillar 4 is always positioned behind the stand base 1 and the crosshead 5—specifically symmetrically relative to the vertical optical axis 10—the pillar 4 according to the invention is located laterally next to the stand base 1 and the crosshead 5 on the rear end of the unit—that is to say that averted from the viewer 11. Thus, the "C" form is realized here in front view by virtue of the fact that instead of being arranged behind the stand base 1 and the crosshead 5, the pillar 4 is arranged next to the stand base 1, and the crosshead 5 is mounted at a spacing above the stand base 1 at the same orientation with which the latter is mounted laterally on the pillar 4.

Figure 1D:
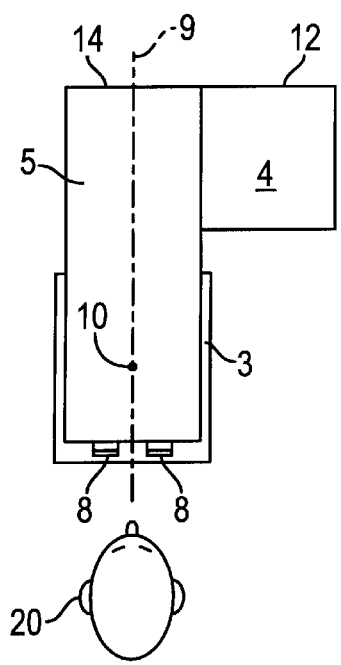

The arrangement of the pillar 4 in the rear area of the microscope stand is illustrated in FIG. 1d, in which the microscope stand is represented in the view from above (plan view). The far overhanging crosshead 5, which covers the stand base 1 arranged therebelow at a spacing, is to be seen. The object stage 3 is also largely covered. The ocular device 8 is to be seen on the crosshead 5. Also represented are the horizontal optical axis 9 through the crosshead 5, as well as the vertical optical axis 10 which is represented in this view only as a point. An operator 20 looks into the ocular device 8. The pillar 4 is arranged laterally in the rear area of the crosshead 5, the rear surface 12 of the pillar 4 terminating with the rear surface 14 of the crosshead 5. The pillar 4 is arranged in this exemplary embodiment at the right-hand rear end of the stand. An arrangement at the left-hand rear end of the stand would also be conceivable, but is unusual, since the automatic loading is performed, as a rule, from the left in the case of inspection microscopes.

In particular, FIGS. 1c and 1d demonstrate the capacity of the novel microscope stand to be loaded freely both from the front as well as from the left and right and now, for the first time, also from the rear. As is to be seen with particular clarity in FIG. 1c, there is free access from the rear side of the microscope stand to the selected operating objective 7 in the position of the vertical optical axis 10. Consequently, the novel microscope stand can ideally be integrated in clusters in the fabrication in the form desired by the semiconductor industry.

By means of large connecting surfaces between the stand base 1, pillar 4 and crosshead 5, as these are represented in FIGS. 1a–d, the necessary statics, which firstly appear not to be achievable in the case of the unusual arrangement of the pillar 4 relative to the crosshead 5 and stand base 1 and the large projection of the crosshead 5, is achieved. Surprisingly, it turned out to be possible to achieve that the stand according to the invention completely satisfies all the static and thermal requirements in use—chiefly in conjunction within an automated manufacturing "street" —the design parameters being determined using the finite element method. The stand base 1 and the crosshead 5 have a large projection, in order also to permit large objects to be inspected without difficulty.

In a particularly advantageous design, the novel microscope is suitable even for investigating extremely-large-area objects such as, for example, 400 mm wafers, or even flat display screens. This design is represented in FIGS. 2a–d.

It is to be seen in FIG. 2a that the pillar 4 has been moved with its rear surface 12 by a good deal to behind the rear surface 14 of the crosshead 5 and the rear surface 13 of the stand base 1. FIG. 2b shows that the pillar 4 has been greatly widened forwards at its upper end and at its base to implement this embodiment. A free operating area, e.g. for traversing the object stage 3, is produced between an upper surface 16 of a lower pillar end widening 15 and a lower surface 17 of an upper pillar end widening 15. The two pillar end widenings 15 in front of their set-back pillar front surface 18 also create a large connecting surface between the stand base 1 and the pillar 4 and/or the crosshead 5 and the pillar 4, as in the exemplary embodiment represented in FIGS. 1a–d, and thereby ensures good statics. This connecting surface 19 is to be seen particularly well in FIG. 2d. As seen by the operator 20, the rear surface 12 of the pillar 4 is displaced far to the rear of the rear surface 14 of the crosshead 5. The widening 15 of the pillar 4 is also illustrated here, and the set-back pillar front surface 18 is covered, and therefore represented by dashes.

FIG. 2c shows that in this advantageous embodiment, as well, the novel "C" form of the stand can be seen from the front. The upper surface 16 of the lower pillar widening 15 and the lower surface 17 of the upper pillar widening 15 are represented as lines on the pillar 4. It is to be seen clearly here, as well, that the operating area can be freely loaded from all sides but now, in particular, also from the rear side of the microscope stand.

Figure 3A:
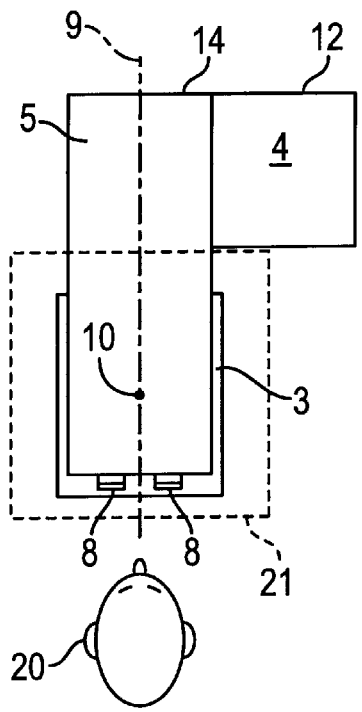
FIG. 3a: shows the stand in accordance with FIG. 1d with a specified stage traversing area.

It may already be seen from the comparison between FIGS. 1a and 1b and the corresponding FIGS. 2a and 2b that the traversing area of the object stage 3 has been substantially enlarged, so that it is now possible to investigate substantially larger samples. The actual gain in the case of the embodiment of the novel microscope stand represented in FIGS. 2a–d can be seen by considering a symmetrical traversing area 21 of the object stage 3 by way of comparison. Thus, FIG. 3a shows the microscope stand according to the invention, already shown in FIG. 1d, in the view from above. In addition, it represents the symmetrical traversing area 21 of the object stage 3. It is clearly to be seen that the stage traversing area 31 is limited by the position of the pillar 4.

Figure 3B:
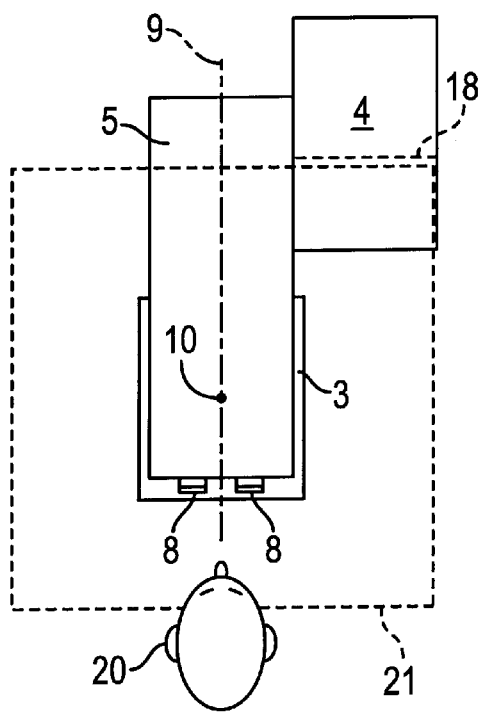
FIG. 3b: shows the stand in accordance with FIG. 2d with a specified extremely large stage traversing area.

FIG. 3b shows the advantageous embodiment of the microscope stand according to the invention which has already been represented in the view from above in FIG. 2d. The symmetrical stage traversing area 21 is represented, as well. It, too, is limited here by the position of the pillar 4. Owing to the position, once again set back, of the pillar 4 and therefore of the set-back pillar front surface 18, it is clearly to be seen here in FIG. 3b that a substantially larger stage traversing area 21 is realized than in FIG. 3a. It is therefore seen that the second exemplary embodiment, represented in FIGS. 2a–d, of the microscope stand according to the invention is also suitable, in particular, for investigating very-large-area objects such as, for example, for investigating flat display screens and similar large-format objects. The widening 15, represented in FIG. 2b and already explained further above, of the pillar 4 at the upper end and at its base is situated outside the stage traversing area 21, and therefore does not impair the latter.

Figure 4A:
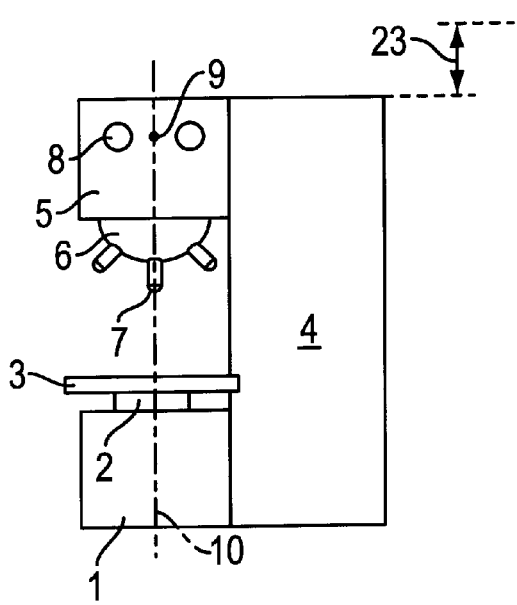
FIG. 4a: shows an exemplary embodiment in accordance with FIG. 1c with marked pillar height.
Figure 4B:
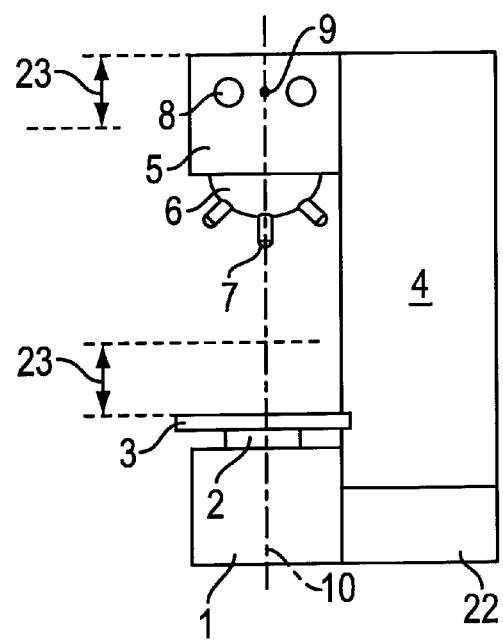

FIG. 4b shows a third advantageous embodiment of the microscope stand according to the invention for other investigations than, for example, wafer investigations, in which the pillar 4 can be adapted to high test objects. For this purpose, it is possible to mount in the pillar 4, or below its base, a lengthening module 22 which lengthens the pillar 4 in a desired measure. The dimension of the pillar lengthening 23 is represented on the unchanged microscope stand in accordance with FIG. 1c, likewise represented for comparison in FIG. 4a. The crosshead 5 mounted on the upper end of the pillar 4 is raised in this case by the measure of the pillar lengthening 23, with the result that the spacing of the crosshead 5 from the stand base 1 is substantially increased. Consequently, it is then also possible for objects with a large dimension in the z-direction to be laid for investigation on the object stage 3. As an illustration, the measure of the pillar lengthening 23 is likewise represented in the operating area of the objective 7.

The use of special additional transportation devices can be dispensed with, by virtue of the fact that the capacity of the microscope stand according to the invention for large-area objects to be freely loaded from all four sides, in particular also from the rear, for the first time, is achieved by the actual design of the microscope stand. This means that the novel microscope can be integrated in a cluster and be loaded directly with wafers from behind. There is no longer any need for a complicated and cost intensive adaptation of the feeder to the transportation system of the cluster. On the basis of its design concept, alone, the novel microscope therefore does not introduce into the clean room any additional components which increase contamination. Its footprint corresponds to comparable known inspection microscopes.

The invention is not limited to the concrete exemplary embodiments represented. Rather, the design principle according to the invention also covers spatial forms of microscope stands which are assembled in modular fashion.

LIST OF REFERENCE NUMERALS

1. Stand base
2. Condenser
3. Object stage
4. Pillar
5. Crosshead
6. Objective device
7. Objective
8. Ocular device
9. Horizontal optical axis of the crosshead 5

10. Vertical optical axis through the objective 3 and condenser 2
11. Viewer
12. Rear surface of the pillar 4
13. Rear surface of the stand base 1
14. Rear surface of the crosshead 5
15. Pillar end widening
16. Upper surface of the lower pillar end widening
17. Lower surface of the upper pillar end widening
18. Set-back pillar front surface
19. Connecting surface
20. Operator
21. Traversing area of the object stage 3
22. Lengthening module
23. Dimension of the pillar lengthening

What is claimed is:

1. A microscope stand for a wafer inspection microscope comprising:

a stand base supporting an object stage;

a cross head supporting an objective device and an eyepiece device, the eyepiece device being positioned at a front-side of the stand, said cross head being spaced apart from said stand base and extending parallel to said stand base;

a vertical pillar having a left-hand side and a right-hand side and being positioned adjacent a rear end of said stand base, said stand base being mounted to one of the left-hand and right-hand sides of said vertical pillar and said cross head being mounted to the same side of said vertical pillar as the stand base;

whereby a direct, rectilinear loading of wafers to be inspected on the object stage can be realised from the left-hand side, the right-hand side and the rear side of the stand base.

2. The microscope stand as claimed in claim 1, wherein a rear side of the pillar terminates flush with a rear side of the stand base and a rear side of the crosshead.

3. The microscope stand as claimed in claim 2, wherein the microscope stand is constructed in one piece.

4. The microscope stand as claimed in claim 2, wherein the microscope stand is constructed in a modular fashion.

5. The microscope stand as claimed in claim 1 wherein a rear side of the pillar is set back with respect to a rear side of the stand base and a rear side of the crosshead.

6. The microscope stand as claimed in claim 5, wherein the pillar has widened portion extending forward and located along the stand base and the crosshead via which the pillar is connected to the stand base and the crosshead.

7. The microscope stand as claimed in claim 6, further comprising a lengthening module attached to the pillar for adjusting the height of the pillar.

8. The microscope stand as claimed in claim 6, wherein the microscope stand is constructed in one piece.

9. The microscope stand as claimed in claim 6, wherein the microscope stand is constructed in modular fashion.

10. The microscopic stand as claimed in claim 5, further comprising a lengthening module be attached to the pillar for adjusting the height of the pillar.

11. The microscope stand as claimed in claim 5, wherein the microscope stand is constructed in one piece.

12. The microscope stand as claimed in claim 5, wherein the microscope stand is constructed in a modular fashion.

13. The microscope stand as claimed in claim 1, further comprising a lengthening module attached to the pillar for adjusting the height of the pillar.

14. The microscope stand as claimed in claim 13, wherein the microscope stand is constructed in one piece.

15. The microscope stand as claimed in claim 13, wherein the microscope stand is constructed in modular fashion.

16. The microscope stand as claimed in claim 1, wherein the microscope stand is constructed in one piece.

17. The microscopic stand as claimed in claim 1, further comprising a lengthening module attached to the pillar for adjusting the height of the pillar.

18. The microscope stand as claimed in claim 1, wherein the microscope stand is constructed in modular fashion.

19. The microscope stand as claimed in claim 1, wherein the vertical pillar comprises a single vertical pillar.

20. A microscope stand for a wafer inspection microscope comprising:

a stand base supporting an object stage;

a cross head supporting an objective device and an eyepiece device, the eyepiece device being positioned at a front-side of the stand, said cross head being spaced apart from said stand base and extending parallel to said stand base;

a vertical pillar having a left-hand side and a right-hand side and being positioned adjacent a rear end of said stand base, said stand base being mounted to one of the left-hand and right-hand sides of said vertical pillar and said cross head being mounted to the same side of said vertical pillar as the stand base;

a plurality of wafer loading openings configured to permit direct, rectilinear loading of wafers, wherein the plurality of openings include openings positioned on the left-hand side, the right-hand side and the rear side of the stand base.

* * * * *